(12) United States Patent
Bae et al.

(10) Patent No.: US 6,337,370 B1
(45) Date of Patent: Jan. 8, 2002

(54) INORGANIC-ORGANIC COPOLYMER USING POLYVINYLALCOHOL-SILANE COUPLING AGENT AND PREPARATION METHOD THEREOF

(75) Inventors: Byeong Soo Bae; Yoon Ki Choi; Young Joo Eo; Oun Ho Park, all of Taejeon (KR)

(73) Assignee: Korean Advanced Institute of Science and Technology, Taejeon (KR)

( * ) Notice: Subject to any disclaimer, the term of this patent is extended or adjusted under 35 U.S.C. 154(b) by 0 days.

(21) Appl. No.: 09/585,866

(22) Filed: Jun. 1, 2000

(30) Foreign Application Priority Data

Jun. 9, 1999 (KR) .............................................. 99-21425

(51) Int. Cl.$^7$ .............................................. C08G 77/08
(52) U.S. Cl. .............................. 525/61; 525/56; 525/70; 528/27; 528/319; 528/411; 524/266; 524/268; 524/557
(58) Field of Search ............................... 525/61, 56, 60; 528/27, 319, 411; 524/266, 268, 557

(56) References Cited

U.S. PATENT DOCUMENTS

| | | |
|---|---|---|
| 3,773,776 A | 11/1973 | Kiler |
| 4,016,129 A | 4/1977 | Miyosawa .................. 260/29.6 |
| 4,262,067 A | 4/1981 | Philipp et al. .............. 429/139 |
| 4,416,938 A | 11/1983 | Haskell ...................... 428/289 |
| 4,478,909 A | 10/1984 | Taniguchi et al. .......... 428/331 |
| 5,134,021 A | 7/1992 | Hosono et al. ............. 428/213 |
| 5,496,649 A | 3/1996 | Mallory et al. ............. 428/518 |
| 5,512,338 A | 4/1996 | Bianchini et al. .......... 428/35.4 |
| 5,547,764 A | 8/1996 | Blais et al. ................. 428/461 |
| 5,604,042 A | 2/1997 | Bianchini et al. ........... 428/507 |
| 6,103,854 A * | 8/2000 | Arakawa et al. ............ 528/196 |

FOREIGN PATENT DOCUMENTS

WO      WO 94/07947      4/1994

* cited by examiner

*Primary Examiner*—James J. Seidleck
*Assistant Examiner*—Olga Asinovsky
(74) *Attorney, Agent, or Firm*—Madson & Metcalf

(57) ABSTRACT

Disclosed are inorganic-organic copolymers and their preparation using polyvinylalcohol-silane coupling agents. The inorganic-organic copolymers can be prepared through the reaction of silane-coupling agents containing hydroxy groups and silane groups with organic metal compounds. The inorganic-organic copolymers are of high transparency as well as shows superb moisture barrier characteristics and hydrophilicity and can be applied as resins or film coatings for many fields, including anti-fogging agents, anti-foaming agents, lubricants, paints, anti-corrosive coatings, water-resistant coatings, plastic or metal-protective coatings.

4 Claims, 3 Drawing Sheets

[FIG.1]
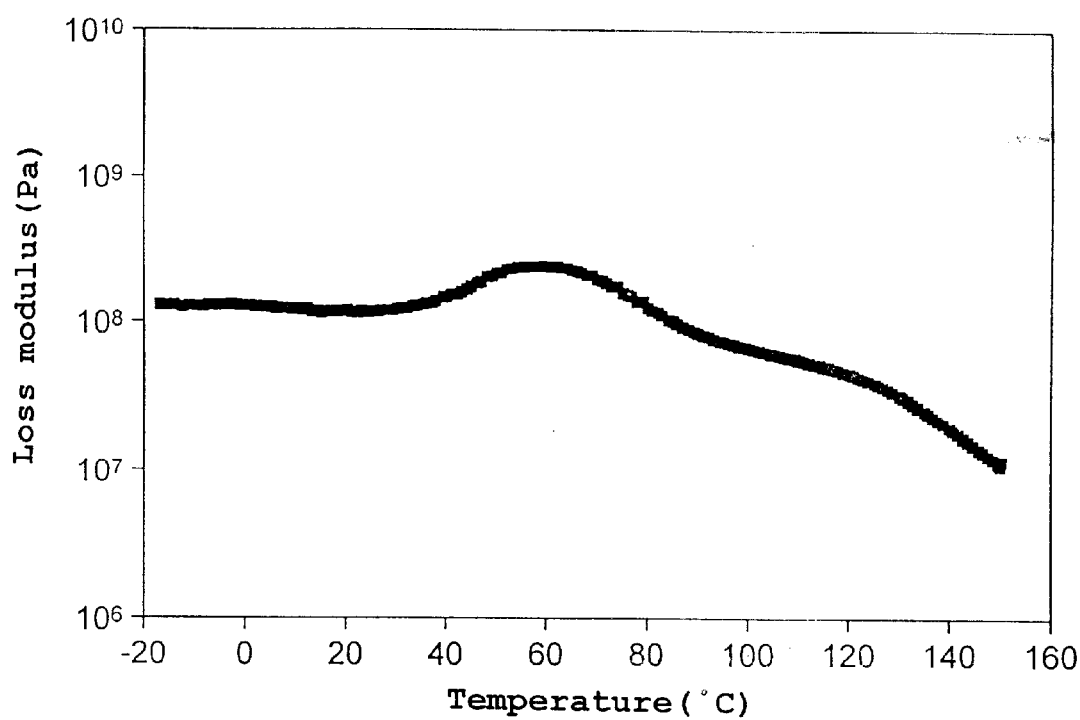

[FIG.2]
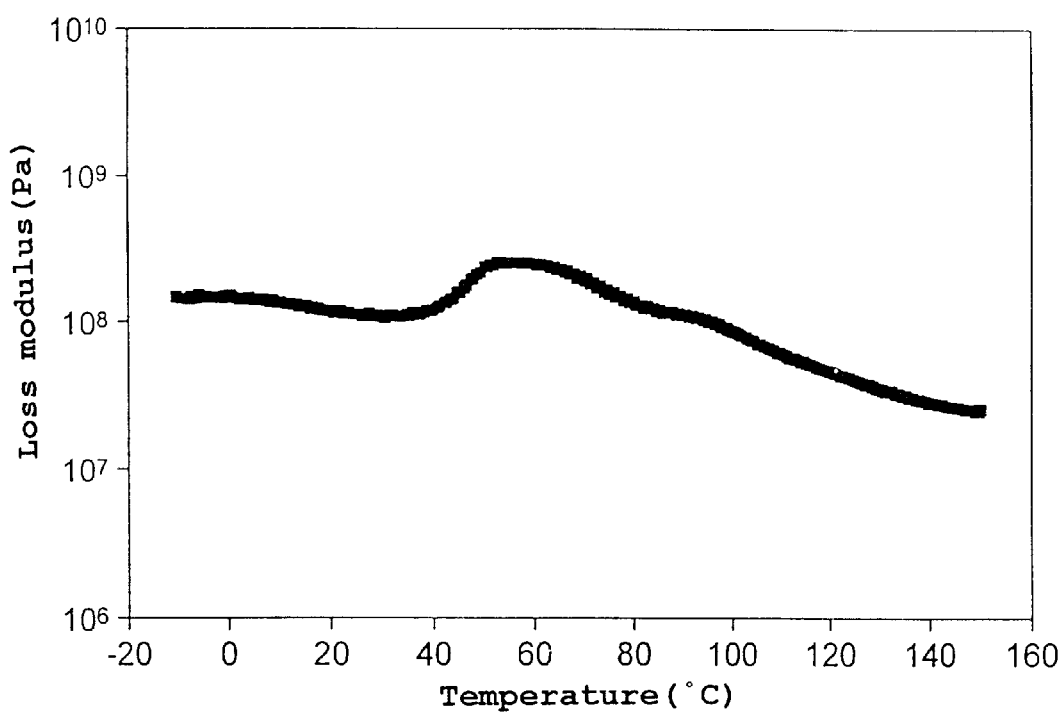

[FIG.3]
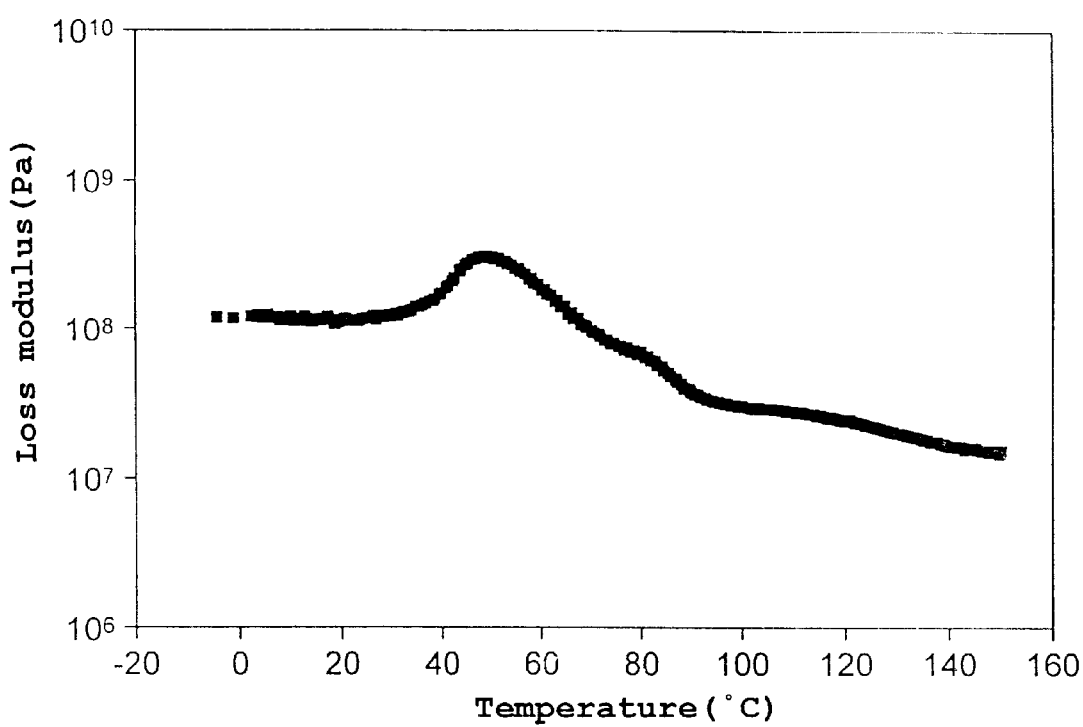

INORGANIC-ORGANIC COPOLYMER USING POLYVINYLALCOHOL-SILANE COUPLING AGENT AND PREPARATION METHOD THEREOF

BACKGROUND OF THE INVENTION

1. Field of the Invention

The present invention relates, in general, to an inorganic-organic copolymer using a polyvinylalcohol-silane coupling agent and its preparation. More particularly, the present invention relates to use of a coupling agent comprising a silane moiety containing an organic functional group capable of the introduction of organic compounds as well as an alkoxide substituent capable of the condensation with inorganic compounds in preparing an inorganic-organic copolymer which is free of phase separation as well as superior in resistance to heat and moisture and in mechanical properties.

2. Description of the Prior Art

When applied to polymer surfaces which have been treated to render them receptive to coatings, polyvinylalcohol, which is of high hydrophilicity, provides an oxygen impermeable barrier and is resistant to permeation by common organic solvents under anhydrous conditions. However, its high water solubility makes it difficult for polyvinylalcohol to conduct its own functions as a coating barrier on a polymer substrate. Poor water resistance of polyvinylalcohol restricts its use as a barrier coating to those few applications where nearly anhydrous conditions prevail. Moisture is known to cause damage on the coating barrier, an unpleasant feel to the touch, and deterioration in oxygen impermeability.

Attempts have been made in the past to overcome these problems. In fact, there have been known a number of methods for increasing the water resistance of polyvinylalcohol. Of them, combination methods of inorganic and organic materials are in active study.

Inorganic-organic combined materials are complexes in which inorganic materials are combined with organic materials in nano levels. When applied to polymer surfaces, these combined materials show improved physical properties without neither cracks, which are frequently found in inorganic materials, nor poor thermal stability and mechanical strength, which always shadows organic materials. However, such combined materials may feasibly suffer phase separation when the inorganic content is increased, which restricts their compositions to a narrow range.

In the present invention, the phase separation is overcome by use of a coupling agent comprising a silane moiety containing an organic functional group capable of the introduction of organic compounds as well as an alkoxide substituent capable of the condensation with inorganic compounds.

Conventional polymeric films for use in packaging can be referred to U.S. Pat. Nos. 5,604,042 and 5,512,338 in which polyurethane, polyethylene or polyethylene terephthalate films can be improved in oxygen impermeability by a coating of a solution obtained by the reaction between polyvinyl alcohol and melamine-formaldehyde. Improved as they are in oxygen barrier characteristics, the polymeric films are poor in moisture resistance. The reference patents further suggested a coating of cellulose or polyvinylidene chloride.

Improvements in the oxygen impermeability are found in U.S. Pat. Nos. 5,547,764, 5,496,649, 4,416,938 and 4,262,067. According to these references, the hydroxy group of polyvinyl alcohol is crosslinked with aldehyde by use of glyoxal and glutaric dialdehyde to better the oxygen barrier characteristics of the film. Although the hydroxy group of the polyvinyl alcohol reacts with aldehyde to form acetal, it plays no roles in the coupling between polyvinyl alcohol chains.

Korean Pat. Laid-Open Publication No. 95-23518 discloses a gas impermeable film which is improved in moisture resistance by use of polyvinyl alcohol and poly(meth) acrylic acid. The above-mentioned patents, which employ organic compounds only, however, show limited mechanical properties.

U.S. Pat. Nos. 3,773,776, 4,016,129, 4,478,909 and 5,134,021 describe anti-fogging films which recruit silica and polyvinyl alcohol. The prepared polyvinyl alcohol-silica compounds simply utilize hydrogen bonds. To improve anti-fogging characteristics, fluorine compounds and aluminum ligand precursors are used in combination.

PCT WO 94/07947 discloses that tetraalkoxy silane is reacted with polyvinyl alcohol in the presence of formic acid to form SiO2 bonds as well as to couple the hydroxy groups of the polyvinyl alcohol chains with the formic acid so as to improve toughness. This reference patent, however, explains a result of the reaction between tetraalkoxy silane and polyvinyl alcohol as the dispersion of polyvinyl alcohol in the inorganic network, instead of the formation of SiO2-polyvinyl alcohol linkages.

Commonly, the conventional composite materials suffer from disadvantages. For example, a slight phase separation occurs between inorganic materials and polymers, greatly deteriorating the transparency. Also, an excess of acid exists within the composite films, so that the organic materials are apt to be decomposed during a drying process.

SUMMARY OF THE INVENTION

It is an object of the present invention to resolve the problem encountered in prior arts and to provide an inorganic-organic copolymer which is free of phase separation as well as superior in resistance to heat and moisture and in mechanical properties.

It is another object of the present invention to provide a method for preparing such an inorganic-organic copolymer, using a silane coupling agent.

BRIEF DESCRIPTION OF THE DRAWINGS

FIG. 1 is a curve in which the weight loss modulus of the inorganic-organic copolymer prepared in Example II is plotted with regard to temperature.

FIG. 2 is a curve in which the weight loss modulus of the inorganic-organic composite material prepared in Comparative Example II is plotted with regard to temperature.

FIG. 3 is a curve in which the weight loss modulus of the polyvinylalcohol prepared in Comparative Example I is plotted with regard to temperature.

DETAILED DESCRIPTION OF THE INVENTION

The present invention contemplates a silane coupling agent which links an organic network to organic polymer chains via covalent bonds, thereby preparing highly transparent inorganic-organic copolymers which do not suffer phase separation.

In accordance with the present invention, there is provided an inorganic-organic copolymer, represented by the following structural formula I, which can be prepared from the polymer, represented by the following structural formula II, as a result of the reaction with an inorganic precursor, represented by the following general formula III:

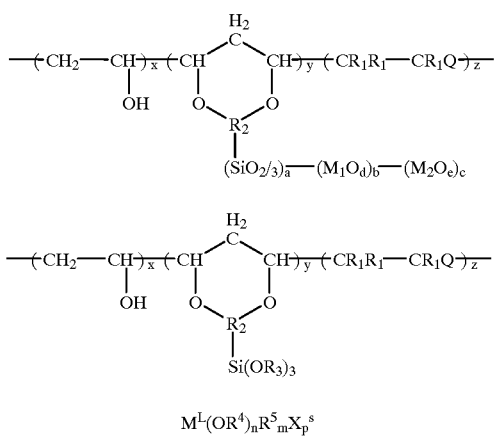

$$M^L(OR^4)_n R^5_m X_p^s \quad \text{III}$$

wherein,

R$_1$ is H or F, Q is H, F or a hydrocarbon with an aldehyde or an ester group;

R$_2$ is a linear or branched, alkyl group of 1–22 carbon atoms;

R$_3$ and R$^4$, which may be the same or different, each is methyl, ethyl, propyl, or butyl, or a hydrogen atom resulting from the hydrolysis of thereof in the presence of an acid catalyst;

R$^5$ is a linear or branch alkyl group of 1–22 carbon atoms, which may contain at least one hetero-atom, such as oxygen, nitrogen and sulfur, or not;

M is a core metal selected from the group consisting of Ti, Zr, Si, Al, Cs, W, Ge and Ta;

n and m each is an integer, satisfying n+m=3–5;

L is the number of coordination bonds ranging from 4 to 6;

X is a chelate ligand;

p is 0, 1 or 2 with a proviso that when p=0, M is Si, Cs, or Ge;

S is 2 (bidentate) or 3 (tridentate), corresponding to the chelating ability of the ligand;

x is a mole fraction ranging from 0.5 to 0.99, y is a mole fraction ranging from 0.01 to 0.2 and z is a mole fraction ranging from 0 to 0.5, under the condition of x+y+z=1;

a is a weight fraction ranging from 0.001 to 10 weight %, b is a weight fraction ranging from 0.1 to 50 weight % and c is a weight fraction ranging from 0.1 to 50 weight %;

d and e are independently 2 or 3/2; and

M$_1$ and M$_2$, which are core metals, each is selected from the group consisting of Ti, Zr, Si, Al, Cs, W, Ge and Ta.

As for the preparation of the inorganic-organic copolymer of the present invention, it starts with the dissolution of the inorganic precursor of the general formula III in alcohol. In this regard, the inorganic precursor is dissolved in a lower alcohol, such as methanol or ethanol, and preferably in a 1N hydrochloric acid-ethanol solution at 0–90° C. and preferably at room temperature for 1–5 hours and preferably 3 hours. A useful inorganic precursor in the present invention is silica sol or tetraethoxy silane. The tetraethoxy silane is commercially available from Aldrich. Afterwards, the resulting solution is added with water to undergo hydrolysis and condensation at 0–90° C. and preferably at room temperature for 1–5 hours and preferably for 3 hours in the presence of an acid or a base catalyst. Subsequently, the hydrolyzed condensate is reacted with the polymer of the structural formula II to give the inorganic-organic copolymer of the structural formula I. When the solution obtained is dried, unreacted reactants can be further subjected to condensation. However, use of a silane precursor, only, does not secure sufficient condensation in an aqueous solution because of a relative large amount of the aqueous solution. In addition, upon drying at high temperatures, polyvinyl alcohol is decomposed to cause coloration, which makes it difficult to establish an inorganic network of a large molecular weight. On the other hand, an adduct which is obtained by linking a silane precursor to a titanium or aluminum precursor via a ligand is found to promote, as a catalyst, the condensation, resulting in establishing inorganic networks of larger molecular weights.

As the acid catalyst, an organic or an inorganic acid may be used. Examples of available organic acid catalysts include acetic acid, formic acid, bromoacetic acid, chloroacetic acid, fluoroacetic acid, α-chloropropionic acid, o-fluorobenzoic acid, hydroxyacetic acid, lactic acid, salicylic acid, tartaric acid, para-toluic acid, polyphosphoric acid and pyrophosphoric acid. Within the range of useful inorganic acids, phosphoric acid, sulfuric acid, hydrochloric acid, nitric acid, hydroiodic acid, stannic acid, and perchloric acid fall. Instead of acid catalysts, base catalysts may be used which are exemplified by caustic soda, ammonia, potassium hydroxide, sodium hydroxide, n-butyl amine, di-n-butyl amine, tri-n-butyl amine, triethyl amine, imidazole, pyridine and ammonium perchlorate.

Use of the inorganic-organic copolymer of the present invention may be made rich by surfactants, UV light absorbents, thickeners, leveling agents, and so on.

Concrete examples of the substituted- or unsubstituted, linear or branched alkyl groups include: hydrocarbons such as methyl, ethyl, n-propyl, isopropyl, n-butyl, sec-butyl, t-butyl, n-pentyl, isopentyl, neopentyl, 1,2-dimethyl propyl, n-hexyl, cyclohexyl, 1,3-dimethyl butyl, 1-isopropyl propyl, 1,2-dimethyl butyl, n-heptyl, 1,4-dimethylpendyl, 2-methyl-1-isopropyl propyl, 1-ethyl-3-methyl butyl, n-octyl, 2-ethyl hexyl, 3-methyl-1-isopropyl butyl, 2-methyl-1-isoproyl butyl, 1-t-butyl-2-methyl propyl, n-nonyl, isocyanopropyl, stylyl, vinyl, aryl, chloroaryl, and cyclohexyl; alkoxyalkyl groups such as methoxymethyl, methoxyethyl, ethoxyethyl, propoxyethyl, butoxyethyl, methoxyethoxyethyl, ethoxyethoxyethyl, dimethoxymethyl, diethoxymethyl, dimethoxyethoxy and diethoxyethyl; halogenoalkyl groups such as chloromethyl, 2,2,2-trichloromethyl, trifluoromethyl, and 1,1,3,3,3-hexafluoro-2-propyl; and alkoxy groups such as methoxy, ethoxy, n-propoxy, n-butoxy, sec-butoxy, and t-butoxy.

In order to prepare the polyvinylalcohol-silane coupling agent of the structural formula II, a method can be referred to Korean Pat. Appl'n No. 99-2073, filed by the present inventors, on Jan. 23, 1999. The metal chelate of the chemical formula III can be prepared according to the method taught in U.S. Pat. No. 4,438,039 or by Dagobert Hoebbel, Thomas Reinert and Helmet Schmidt, Journal of Sol-Gel Science and Technology, 10, 115–126, 1997. Alternatively, the preparation of the metal chelate can be achieved by the hydrolysis in a mixture of a chelate ligand and an alkoxy silane in the presence of 1N hydrochloride-ethanol and then by deactivation.

For the formation of the core metal of the inorganic precursor represented by the general formula III, oxides of silane, titanium, zirconium, aluminum, cesium, and tungsten are used alone or in combination. Concrete examples of such inorganic precursors include titanium tetraethoxide, titanium tetrapropoxide, titanium tetrabutoxide, zirconium tetraethoxide, zirconium tetrapropoxide, zirconium tetrabutoxide, aluminum triethoxide, aluminum tripropoxide, aluminum tributoxide, tungsten hexamethodixe, tungsten hexaethoxide, tungsten hexapropoxide, cecium tetramethoxide, cesium tetraethoxide, cesium tetrapropoxide, tantalum pentamethoxide, tantalum pentaethoxide, tantalum pentapropoxide, germanium tetramethoxide, germanium tetraethoxide, germanium tetrapropoxide, tetramethoxysilane, tetraethoxysilane, tetrapropoxysilane, tetrabutoxysilane, vinyltrimethoxysilane, vinyltriethoxysilane, vinyltripropoxy silane, vinyltriacetoxysilane, vinyldimethoxyethoxysilane, aminopropyl trimethoxysilane, aminopropyl triethoxysilane, aminopropyl tripropoxysilane, N-(3-acryloxy-2-hydroxypropyl)-3-aminopropyl trimethoxy silane, N-(3-acryloxy-2-hydroxypropyl)-3-aminopropyl triethoxysilane, 3-acryloxypropyl dimethoxysilane, 3-acryloxypropyl diethoxysilane, 3-acryloxypropyl dipropoxysilane, 3-(meth)acryloxypropyltrimethoxy silane, 3-(meth)acryloxypropyl trimethoxysilane, 3-(meth)acryloxypropyl triethoxysilane, 3-(meth)acryloxypropyl tripropoxysilane, N-(2-aminoethyl-3-aminopropyl)-trimethoxy silane (DIAMO), N-(2-aminoethyl-3-aminopropyl)-triethoxy silane, N-(2-aminoethyl-3-aminopropyl)-tripropoxysilane, N-(2-aminoethyl-3-aminopropyl)-tributoxysilane, trimethoxy silylpropylethylenetriamine (TRIAMO), triethoxysilylpropyl ethylenetriamine, tripropoxysilylpropylethylenetriamine, tributhoxysylylpropylethylenetriamine, 2-glycidoxyethyl trimethoxysilane, 3-glycidoxypropyltrimethoxysilane, 2-glycidoxypropyltrimethoxysilane, 2-glycidoxyethylmethyl dimethoxysilane, 2-glycidoxyethylethyldiethoxysilane, 3-glycidoxypropylmethyldimethoxysilane, 3-glycidoxypropyl methyldiethoxysilane, 2-glycidoxyethylethyldimethoxysilane, 3-glycidoxypropylethyldimethoxysilane, 3-glycidoxypropyl ethydiethoxysilane, 2-glycidoxypropylethyldiethoxysilane, 2-glycidoxyethylpropyldimethoxysilane, 2-(3,4-ethoxy cyclohexyl)ethyltrimethoxysilane, 2-(3,4-ethoxycyclohexyl) ethyltriethoxysilane, ethyltrimethoxysilane, methyltriethoxy silane, 3-chloropropyltrimethoxysilane, 3-chloropropyl tripropoxysilane, 2-chloropropyltributoxysilane, phenyl trimethoxysilane, phenyltriethoxysilane, 3,3,3-trifluoro propyltrimethoxysilane, dimethyldimethoxysilane and 3-chloropropylmethyldimethoxysilane.

Replacing the inorganic precursor, a metal oxide may be used, which is exemplified by silica, bohemite, alumina, zirconia or titania.

Since all of the metal oxide precursors but silane compounds are of high reactivity, they are used together with the chelate ligands represented by the following structural formula IV:

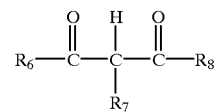

IV wherein $R_6$ is a substituted or non-substituted, linear or branched alkyl group of monovalance, $R_7$ is hydrogen, or is selected from the group consisting of alkyl, haloalkyl, and acyl, all of which contain not more than eight carbon atoms, or forms, together with $R_6$, an cycloalkyl group containing not more than 12 carbon atoms and at least one substituent selected from the group consisting of a chloro group, a nitro group, an acyl group, a cyano group and a carboxy ester group, and $R_8$ is a linear or branched alkyl group containing not more than eight carbon atoms, which may be non-substituted or substituted with a halogen group, a cyano group or an amino group, or represents $OR_9$ wherein $R_9$ is a substituted or non-substituted linear or branched hydrocarbon containing eight carbon atoms or a monovalent hydrocarbon containing a polyether or ether group.

Concrete examples of the chelate ligands include acetylacetonate, methylacetoacetate, propylacetoacetate, i-butylacetoacetate, pentylacetoacetate, hetylacetoacetate, heptylacetoacetate, octylacetoacetate, ethylacetoacetate, bisacetylacetonate, bisethylacetoacetate, di-n-butoxide monoethylacetoacetate, di-i-propoxide monomethylacetoacetate, acetylacetone and benzoylacetone.

A better understanding of the present invention may be obtained in light of the following examples which are set forth to illustrate, but are not to be construed to limit the present invention.

EXAMPLE I

Preparation of Polyvinylalcohol-Silane Coupling Agent 12.5 g of polyvinyl alcohol (average molecular weight 89,000–98,000, saponification degree 99% or higher, Aldrich) was dissolved in 237.5 g of water at 80° C. for 3 hours to give a 5% aqueous solution which was cooled to room temperature and added with a solution of 0.625 g of 3,3-diethoxypropyltriethoxysilane (5% by weight compared with the polyvinyl alcohol) in 20 ml of ethanol. After the precipitated polyvinyl alcohol was dissolved by heating at 80° C. for 3 hours, the resulting solution was allowed to react at 80° C. for 3 hours in the presence of 5 ml of a 0.01 N sulfuric acid solution to give a polyvinyl alcohol-silane solution.

EXAMPLE II

Precipitation of Inorganic-Organic Copolymer Composed of Polyvinylalcohol-Silica-Titanium Oxide In 15 ml of ethanol, 0.4 ml of ethylacetoacetate (Aldrich) and 1.8 g of tetraethylolsosilicate (TEOS, Si(OEt)4, Aldrich) were reacted with 0.2 g of titanium isopropoxide (Ti(Opr)4 Aldrich) at room temperature for 2 hours. After being dropwise added with 1 ml of a 1N hydrochloric acid-ethanol solution, the reaction was allowed to react at room temperature for 2 hours. Equal aliquots of 5 ml of distilled water were added over five rounds, each round followed by 5 hours reaction. Then, 10 ml of distilled water was further added, followed by one hour reaction. To this solution, the polyvinyl alcohol (10 g)-silane coupling agent (0.5 g, 5% by weight compared with polyvinyl alcohol) prepared in Example I was reacted at room temperature for three hours under the atmospheric pressure to give an inorganic-organic copolymer solution.

EXAMPLE III

Preparation of Inorganic-Organic Copolymer Comprised of Polyvinylalcohol-Alkyl Silica-Titanium Oxide An inorganic-organic copolymer solution was prepared in the same manner as in Example I, except for using 1.8 g of 3-glycidoxypropyltrimethoxysilane (GPTS, Aldrich), instead of tetraethylolsosilicate.

EXAMPLE IV

Preparation of Polyvinylalcohol-Silica Copolymer in the Presence of Acid Catalyst In 30 ml of ethanol was dissolved 2.5 g of tetraethylolsosilicate (20% by weight compared with polyvinylalcohol) and added with 30 ml of a 0.01 N sulfuric acid, followed by reacting the reactants at room temperature for three hours. This reactant solution was reacted with 270 ml of the polyvinylalcohol-silane coupling obtained in Example I at 80° C. for 3 hours to afford a polyvinylalcohol-silica copolymer solution.

EXAMPLE V

Preparation of Polyvinylalcohol-Silica Copolymer in the Presence of Base Catalyst A solution of 2.5 g of tetraethylolsosilicate (20% by weight compared with polyvinylalcohol) in 30 ml of ethanol was added in 270 ml of the polyvinylalcohol-silane coupling solution obtained in Example I. This mixed solution was controlled to 10 in pH by the dropwise addition of ammonia water (Aldrich) and allowed to react at room temperature for 3 hours to afford a polyvinylalcohol-silica copolymer solution.

EXAMPLE VI

Preparation of Polyvinylalcohol-Silica Copolymer

A polyvinylalcohol-silica copolymer solution was prepared in the same manner as in Example III, except for using 2.40 g of silica sol (30% aqueous $SiO_2$ solution, 20% by weight compared with polyvinylalcohol, Aldrich).

EXAMPLE VII

Preparation of Polyvinylalcohol-Silica Copolymer

A polyvinylalcohol-silica copolymer solution was prepared in the same manner as in Example III, except for using 2.5 g of methyltriethoxysilane (20% by weight based on weight of polyvinylalcohol).

COMPARATIVE EXAMPLE I

Preparation of Aqueous Polyvinylalcohol Solution 12.5 g of polyvinylalcohol (Avg. Mw=89,000–98,000, saponification degree 99% or higher, Aldrich) was dissolved in 237.5 g of distilled water at 80° C. for 3 hours. After being cooled to room temperature, the 5% aqueous solution was added with 20 ml of ethanol and 5 ml of a 0.01 N sulfuric acid solution. A reaction was allowed to occur at 80° C. for 3 hours to produce a polyvinylalcohol solution.

COMPARATIVE EXAMPLE II

Preparation of Polyvinylalcohol-Silica Oxide Composite

A polyvinylalcohol-silica oxide composite solution was obtained as described in U.S. Pat. Nos. 4,016,129 and 5,134,021. First, 2.5 g of tetraethylolsosilicate (20% by weight compared with polyvinylalcohol) was dissolved in 30 ml of ethanol and added with 30 ml of a 0.01 N sulfuric acid solution, followed by reaction at room temperature for 3 hours. 250 ml of a 5% aqueous polyvinylalcohol solution was added. Reacting the solution mixture at 80° C. for 3 hours gave a polyvinylalcohol-silica oxide composite solution.

TEST EXAMPLE I

An examination was made of the change in moisture resistance of inorganic-organic copolymers with regard to their composition. Using the compositions indicated in Table 1, inorganic-organic copolymer solutions were prepared as described in Examples II through VII and Comparative Example II. 50 ml of each of the inorganic-organic copolymer solutions was put in a petri dish 8.5 cm in diameter and dried at 50° C. for 24 hours and further at 90° C. for 24 hours under the atmospheric pressure. The inorganic-organic copolymers thus obtained were immersed in water at 60° C. for 1 hour, followed by drying at 90° C. for 24 hours. The moisture resistance of the inorganic-organic copolymers was determined based on their weight loss (%) which was obtained by measuring the weights before and after the immersion in water. The results are given in Table 1, below.

TABLE I

Moisture Resistance of Inorganic-Organic Copolymer

| | No. of Examples | | | | | | |
|---|---|---|---|---|---|---|---|
| | II | III | IV | V | VI | VII | C. II |
| 5% PVA (ml) | 50 | 50 | 50 | 50 | 50 | 50 | 50 |
| Silane Coupling | 0.125 | 0.125 | 0.125 | 0.125 | 0.125 | 0.125 | — |
| Catalyst | 0.01N H2SO4 1 ml | 0.01N H2SO4 1 ml | 0.01N H2SO4 1 ml | 25% NH4OH 0.1 ml | 0.01N H2SO4 1 ml | 0.01N H2SO4 1 ml | 0.01N H2SO4 1 ml |
| Inorganic Precursor | Ti(O-i-r)4; 50 mg 1EAA: 45 μl TEOS; 0.45 g | Ti(O-i-Pr)4; 50 mg 1EAA: 45 μl GPTS; 0.45 g | TEOS; 0.5 g | TEOS: 0.5 g | 30% Silica sol (aq) 0.48 g | MTES; 0.5 g | TEOS; 0.5 g |
| Inorganic-Organic Copolymer Wt (g) | 2.131 | 2.147 | 1,961 | 2.115 | 1.974 | 2.045 | 1.925 |
| Wt. Loss (%) | 3 | 2.5 | 10 | 10.5 | 7 | 12 | 23 |

1 Ethylacetoacetate

TEST EXAMPLE II

An examination was made of the change in hydrophilicity of inorganic-organic copolymers with regard to their composition. Using the compositions indicated in Table 2, inorganic-organic copolymer solutions were prepared as described in Examples II through VII and Comparative Example II. Each of the inorganic-organic copolymer solutions was put in an acryl plate with a dimension of 20×20 cm and dried at 50° C. for 24 hours and further at 60° C. for 24 hours. Water was dropwise added onto the inorganic-organic copolymer films thus obtained, followed by measuring the contact angle of the films 30 sec later. The results are given in Table 2, below.

composition. Using the compositions indicated in Table 3, inorganic-organic copolymer solutions were prepared as described in Examples II through VII and Comparative Example II. 40 ml of each of the inorganic-organic copolymer solutions was put in a petri dish 8.5 cm in diameter and dried at 50° C. for 24 hours and further at 90° C. for 24 hours under the atmospheric pressure. The inorganic-organic copolymers thus obtained were immersed in water at 12° C. for 24 hours, after which the water on the surface of the copolymers was removed with tissue paper. The hygroscopicity of the inorganic-organic copolymers was determined by measuring the weights before and after the immersion in water. In order to reduce the experimental errors which would occur, the above procedure was repeated five times

TABLE 2

Contact Degree of Inorganic-Organic Copolymer

| | Nos. of Examples | | | | | | |
|---|---|---|---|---|---|---|---|
| | II | III | IV | V | VI | VII | C. II |
| PVA sol'n | 5 | 5 | 5 | 5 | 5 | 5 | 5 |
| Silane Coupling (Wt % to PVA) | 10 | 3 | 5 | 5 | 5 | 5 | — |
| Inorganic Precursor (Wt % to PVA) | — | TEOS 10% | TEOS 20% | Silica sol 20% | Ti(O-1Pr)4 2%, TEOS 18% | MTES 20% | — |
| Contact Angle (°) | 64 ± 3 | 40 ± 4 | 45 ± 3 | 42 ± 4 | 44 ± 5 | 68 ± 2 | 36 ± 4 |

TEST EXAMPLE III

An examination was made of the change in hygroscopicity of inorganic-organic copolymers with regard to their and the measured values are averaged. The results are given in Table 3, below.

TABLE 3

Hygroscopicity of Inorganic-Organic Copolymer

| | Nos. of Examples | | | | | | |
|---|---|---|---|---|---|---|---|
| | II | III | IV | V | VI | VII | C. II |
| 5% PVA (g) | 40 | 40 | 40 | 40 | 40 | 40 | 40 |
| Silane Coupling Agent (wt % to PVA) (g) | 5 | 5 | 5 | 5 | 5 | 5 | — |
| Inorganic Precursor (wt % to PVA) (g) | — | TEOS; 5 | TEOS; 20 | MTES; 20 | GPTS; 20 | Ti(O1Pr)4; 2, | — |

TABLE 3-continued

Hygroscopicity of Inorganic-Organic Copolymer

| | Nos. of Examples | | | | | | |
|---|---|---|---|---|---|---|---|
| | II | III | IV | V | VI | VII | C. II |
| | | | | | GPTS; 18 | | |
| Sample wt (g) | 1.81 | 1.685 | 1.691 | 1.77 | 1.868 | 1.845 | 1.914 |
| hygroscopicity (%) | 158 | 155 | 122 | 145 | 122 | 131 | 169 |

TEST EXAMPLE IV

An examination was made of the change in cloudiness and transmittancy of inorganic-organic copolymers with regard to their composition. Using the compositions indicated in Table 4, inorganic-organic copolymer solutions were prepared as described in Examples II through VII and Comparative Example II. Each of the inorganic-organic copolymer solutions was put in an acryl plate with a dimension of 20×20 cm and dried at 50° C. for 24 hours and further at 60° C. for 24 hours to produce films. The cloudiness of the films was measured according to ASTM D 1003 while the films were irradiated with a light within the range of visible light frequencies for the measurement of transmittancy. The results are given in Table 4, below.

fields, including anti-foaming agents, lubricants, paints, anti-corrosive coatings, water-resistant coatings, plastic or metal-protective coatings, coatings for electrical and electronic parts, electrochromatic coatings, high refractive lens, glasses, heat-resistant materials and infrared reflective thin films, anti-fogging coatings, ant-contaminative coatings, gas-impermeable films, photo-curable materials, UV-curable ink and paints, cell electrolytes and the like.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the

TABLE 4

Cloudiness and Transmittancy of Inorganic-Organic Copolymer

| | Nos. of Examples | | | | | | | |
|---|---|---|---|---|---|---|---|---|
| | II | III | IV | V | VI | VII | C. I | C. II |
| PVA (%) | 5 | 5 | 5 | 5 | 5 | 5 | 5 | 5 |
| Silane Coupling Agent (wt % to PVA) | 10 | 3 | 5 | 5 | 5 | 5 | — | — |
| Inorganic Precursor (wt % to PVA) | — | TEOS 10% | TEOS 20% | Silica Sol 20% | Ti(O-1Pr)4 2% TEOS 18% | MTES 20% | — | TEOS 20% |
| Film Thick. (μm) | 77 | 69 | 30 | 48 | 118 | 61 | 80 | 69 |
| Cloudiness (%) | 2.1 | 0.8 | 1.3 | 3.2 | 4.2 | 1.4 | 6.2 | 12.1 |
| Transmittancy (%) | 91. | 91.7 | 91.9 | 91.8 | 90.2 | 93.3 | 90. | 89.8 |

TEST EXAMPLE IV

An examination was made of the change in weight loss modulus of inorganic-organic copolymers before and after immersion in water. Each of the Inorganic-organic copolymer solutions prepared as described in Examples II through VII and Comparative Example II was put in an acryl plate with a dimension of 20×20 cm and dried at 50° C. for 24 hours and further at 60° C. for 24 hours. The inorganic-organic copolymer films thus obtained were cut into pieces with a size of 1×3 cm. Their weight loss moduli were monitored with the aid of a DMTA apparatus (DMTA-MARK-4, Rheo Metric Scientifics) at 1 hertz while being immersed in water which was heated at a rate of 3° C. per min from 0° C. to 150° C. The results are shown in FIGS. 1 to 3.

Taken together, the data obtained demonstrate that the polymer-metal oxides prepared according to the present invention are novel inorganic-organic copolymers which are greatly improved in moisture resistance and hydrophilicity. Therefore, they can find numerous applications in many appended claims, the invention may be practiced otherwise than as specifically described.

What is claimed is:

1. An inorganic-organic copolymer, represented by the following general formula I:

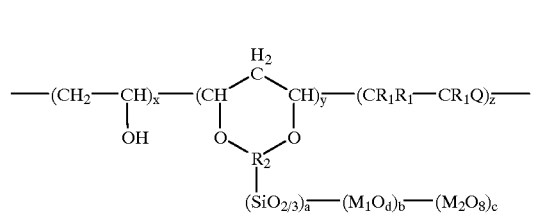

wherein, $R_1$ is H or F;

Q is H, F or a hydrocarbon with an aldehyde or an ester group;

$R_2$ is a linear or branched, alkyl group of 1–22 carbon atoms, which contains at least one hetero atom selected from oxygen, nitrogen and sulfur or not;

$M_1$ and $M_2$, which may be different or the same, each is a core metal selected from the group consisting of Ti, Zr, Si, Al, Cs, W, Ge and Ta;

X is a mole fraction ranging from 0.5 to 0.99, y is a mole fraction ranging from 0.01 to 0.2, and z is a mole fraction ranging from 0 to 0.5, under the condition of x+y+z=1;

a is a weight fraction ranging from 0.001 to 10 weight %, b is a weight fraction ranging from 0.1 to 50 weight %, and c is a weight fraction ranging from 0.1 to 50 weight %, and d and e are independently 2 or 3/2.

2. A method for preparing the inorganic-organic copolymer represented by the general formula I as defined in claim 1, comprising the step of reacting a polyvinylalcohol-silane coupling agent represented by the following general formula II to an inorganic precursor represented by the following general formula III at 0–90° C. for 1–5 hours in the presence of an acid or a base catalyst:

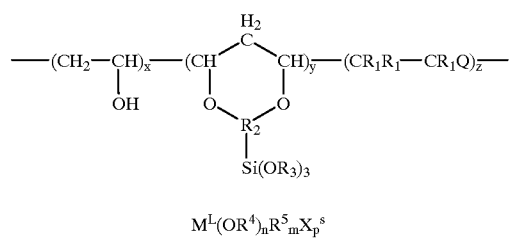

II

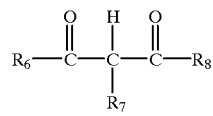

III wherein, $R_1$, $R_2$, x, y, and z are defined in the structural formula I, $R_3$ and $R^4$, which may be the same or different, each is methyl, ethyl, propyl, or butyl, or a hydrogen atom resulting from the hydrolysis thereof in the presence of an acid catalyst;

$R^5$ is a linear or branched alkyl group of 1–22 carbon atoms, which contains at least one hetero-atom selected from oxygen, nitrogen and sulfur, or not;

M is a core metal selected from the group consisting of Ti, Zr, Si, Al, Cs, W, Ge, and Ta; n and m each is an integer, satisfying n+m=3–5;

L is the number of coordination bonds ranging from 4 to 6;

X is a chelate ligand;

p is 0, 1 or 2 with a proviso that when p=0, M is Si, Cs, or Ge; and

S is 2 (bidentate) or 3 (tridentate), corresponding to the chelating ability of the ligand.

3. The method as set forth in claim 2, wherein said inorganic precursor, in advance of reaction with the polyvinylalcohol-silane coupling agent of the general formula II, is activated by a chelate ligand represented by the following general formula IV in the presence of an acid or a base catalyst:

$$R_6-\underset{\parallel}{\overset{O}{C}}-\underset{\underset{R_7}{|}}{\overset{H}{C}}-\underset{\parallel}{\overset{O}{C}}-R_8 \qquad IV$$

wherein, $R_6$ is a substituted or non-substituted, linear or branched alkyl group of monovalance;

$R_7$ is hydrogen, or is selected from the group consisting of alkyl, haloalkyl, and acyl, all of which contain not more than eight carbon atoms, or forms, together with $R_6$, an cycloalkyl group containing not more than 12 carbon atoms and at least one substituent selected from the group consisting of a chloro group, a nitro group, an acyl group, a cyano group and a carboxy ester group; and $R_8$ is a linear or branched alkyl group containing not more than eight carbon atoms, which may be non-substituted or substituted with a halogen group, a cyano group or an amino group, or represents $OR_9$ wherein $R_9$ is a substituted or non-substituted linear or branched hydrocarbon containing eight carbon atoms or a monovalent hydrocarbon containing a polyether or ether group.

4. The method as set forth in claim 2 or 3, wherein said acid or base catalyst is selected from the group consisting of acetic acid, formic acid, bromoacetic acid, chloroacetic acid, fluoroacetic acid, α-chloropropionic acid, o-fluorobenzoic acid, hydroxyacetic acid, lactic acid, salicylic acid, tartaric acid, para-toluic acid, polyphosphoric acid, pyrophosphoric acid, phosphoric acid, sulfuric acid, hydrochloric acid, nitric acid, hydroiodic acid, stannic acid, perchloric acid, caustic soda, ammonia, potassium hydroxide, sodium hydroxide, n-butyl amine, di-n-butyl amine, tri-n-butyl amine, triethyl amine, imidazole, pyridine and ammonium perchlorate.

* * * * *